(12) United States Patent
Linn

(10) Patent No.: US 10,649,319 B2
(45) Date of Patent: May 12, 2020

(54) CAMERA ADAPTER FOR OPTICAL EQUIPMENT

(71) Applicant: Timothy H. Linn, Pueblo West, CO (US)

(72) Inventor: Timothy H. Linn, Pueblo West, CO (US)

( * ) Notice: Subject to any disclaimer, the term of this patent is extended or adjusted under 35 U.S.C. 154(b) by 0 days.

(21) Appl. No.: 16/262,723

(22) Filed: Jan. 30, 2019

(65) Prior Publication Data

US 2019/0235355 A1 Aug. 1, 2019

Related U.S. Application Data

(60) Provisional application No. 62/709,761, filed on Jan. 30, 2018.

(51) Int. Cl.
| | |
|---|---|
| *G03B 17/56* | (2006.01) |
| *G02B 25/00* | (2006.01) |
| *H04N 5/225* | (2006.01) |

(52) U.S. Cl.
CPC ......... *G03B 17/561* (2013.01); *G02B 25/001* (2013.01); *H04N 5/2251* (2013.01); *H04N 5/2253* (2013.01)

(58) Field of Classification Search
USPC .......................... 396/448, 419, 428; 359/511
See application file for complete search history.

(56) References Cited

U.S. PATENT DOCUMENTS

| | | | | |
|---|---|---|---|---|
| 5,495,676 | A * | 3/1996 | Chesnut ................. | F41G 1/383 359/511 |
| 6,033,130 | A * | 3/2000 | Muroi .................... | G03B 17/04 396/448 |
| 6,247,855 | B1 * | 6/2001 | Motohashi ............. | G03B 17/02 396/448 |
| 6,289,625 | B1 * | 9/2001 | Phares ..................... | F41G 1/38 42/111 |
| 6,416,189 | B1 * | 7/2002 | Watson ................... | G02B 23/16 359/511 |
| 7,484,856 | B1 * | 2/2009 | Newhall .................. | F41G 1/04 359/511 |
| 7,585,080 | B2 * | 9/2009 | Ballard ................... | F41G 1/383 359/511 |
| 7,721,480 | B2 * | 5/2010 | Campean ................ | F41G 1/383 42/129 |
| 8,842,981 | B2 | 9/2014 | Fujikake et al. | |

(Continued)

*Primary Examiner* — Clayton E. LaBalle
*Assistant Examiner* — Warren K Fenwick
(74) *Attorney, Agent, or Firm* — Robert C. Corbett; Timothy Stevens; Technology Law, PLLC

(57) ABSTRACT

A cap assembly for use with an optical device having an eyepiece includes an attachment member defining a cavity having a first opening and a second opening that are colinear. The first opening is dimensioned such that the eyepiece is insertable into the cavity through the first opening to secure the cap assembly to the eyepiece. A camera holder is rotatably mounted with respect to the attachment member, such as via a hinge, such that the camera holder is selectively movable between a first position in which the camera holder is colinear with the first opening, second opening, and cavity, and a second position in which the camera holder is not colinear with the first opening, second opening, and cavity.

9 Claims, 4 Drawing Sheets

(56) References Cited

U.S. PATENT DOCUMENTS

2003/0133709 A1* 7/2003 Kobayashi ............. G03B 17/02
                                                    396/448
2012/0240444 A1   9/2012 Russell
2017/0346998 A1* 11/2017 Rhoden ................ H04N 5/2252

* cited by examiner

CAMERA ADAPTER FOR OPTICAL EQUIPMENT

CROSS-REFERENCE TO RELATED APPLICATION

This application claims the benefit of U.S. Provisional Application No. 62/709,761, filed Jan. 30, 2018, and which is hereby incorporated by reference in its entirety.

TECHNICAL FIELD

This disclosure relates to eyepiece attachments for optical devices.

BACKGROUND

Conventional spotting scopes and binoculars used for hunting and target shooting provide significant advantages to their users but require that the eye of the user be positioned over the eyepiece of the scope or binoculars. A target shooter often has to change his/her shooting position to view the target. A hunter does not want to spend too much time looking through a scope or binoculars in case game is seen outside the field of view of the scope or the binoculars.

SUMMARY

A cap assembly for use with an optical device having an eyepiece includes an attachment member defining a cavity having a first opening and a second opening. The cavity, first opening, and second opening are colinear. The first opening is dimensioned such that the eyepiece is insertable into the cavity through the first opening to secure the cap assembly to the eyepiece. A camera holder is rotatably mounted with respect to the attachment member, such as via a hinge, such that the camera holder is selectively movable between a first position in which the camera holder is colinear with the first opening, second opening, and first cavity, and a second position in which the camera holder is not colinear with the first opening, second opening, and first cavity.

Accordingly, when the camera holder is in the first position, a camera attached to the camera holder is within a line of sight to the eyepiece and can capture images from the eyepiece. In one embodiment, the camera is a wireless digital video camera and can transmit signals to a mobile phone's screen, laptop screen, etc. When the camera holder is moved to the second position, the line of sight through the attachment assembly to the eyepiece is unobstructed, thereby permitting a user to look through the eyepiece in a conventional manner.

In another aspect of the invention, the cap assembly includes contact members inside the cavity that are movable to accommodate eyepieces of differing sizes.

The above features and advantages and other features and advantages of the present disclosure are readily apparent from the following detailed description of the best modes for carrying out the disclosure when taken in connection with the accompanying drawings

DESCRIPTION OF THE PREFERRED EMBODIMENTS

Figures 1, 2:
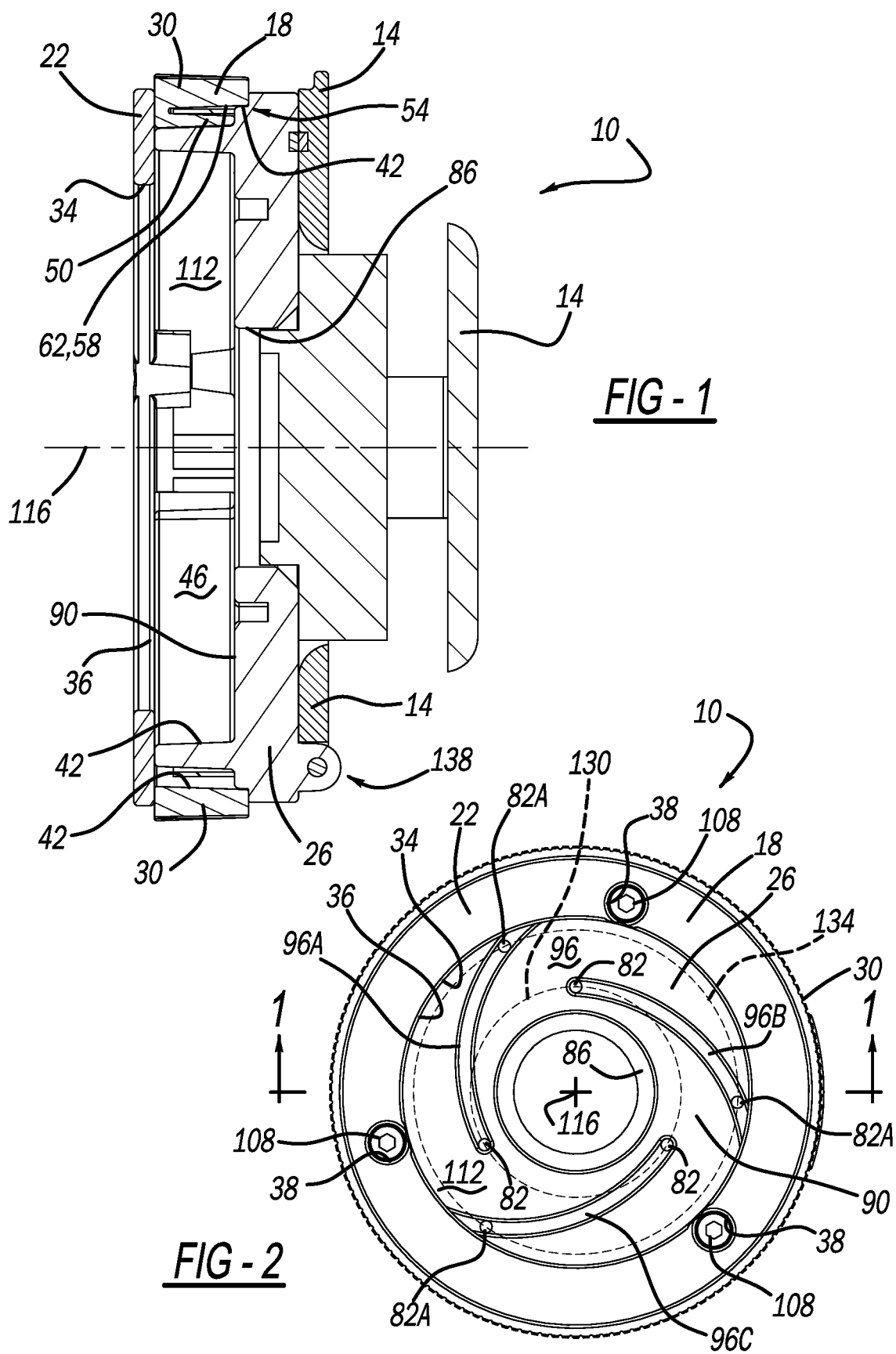
FIG. 1 is a schematic, sectional, side view of a cap assembly for an optical device.
FIG. 2 is a schematic, bottom view of the cap assembly.
Figure 3:
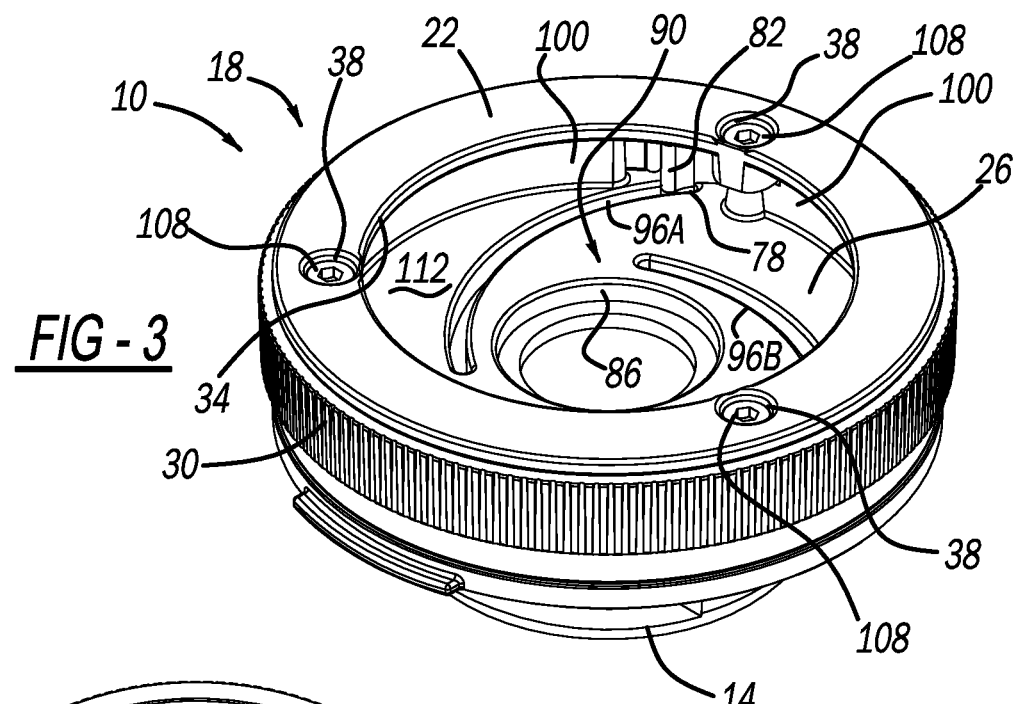
FIG. 3 is a schematic, perspective view of the cap assembly.

Referring to the FIGS. 1-3, wherein like reference numbers refer to like components throughout, a cap assembly 10 is schematically depicted. The cap assembly 10 includes a camera holder 14 and an eyepiece attachment member 18. The eyepiece attachment member 18 is configured to operatively connect the camera holder 14 to an optical device such that a camera affixed to the camera holder will receive images from the eyepiece.

The eyepiece attachment member 18 includes a base member 22, a spring guide member 26, and a spring retainer member 30. In the embodiment depicted, the base member 22 is annular. More specifically, the base member 22 includes an inner surface 34 that defines a circular hole 36 extending through the base member 22. The base member 22 shown also defines a plurality of attachment holes 38.

Figure 4:
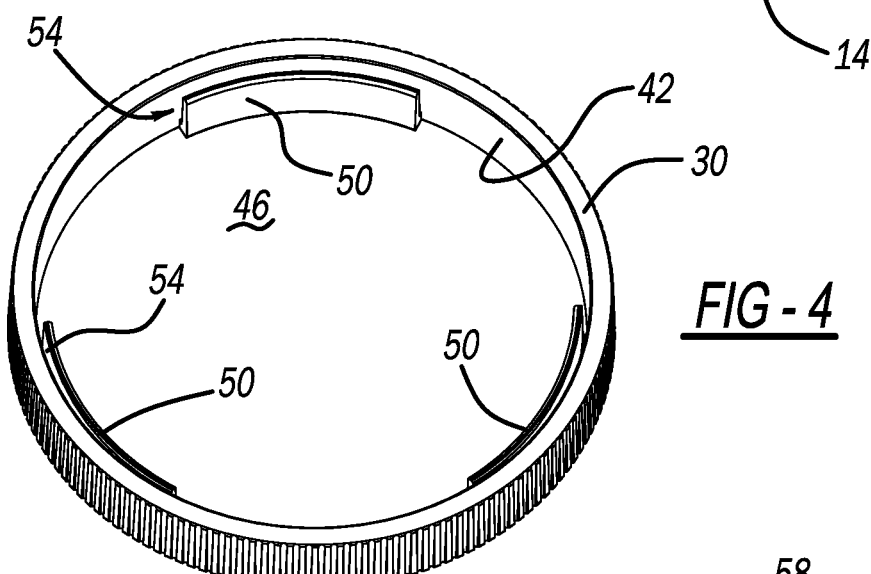
FIG. 4 is a schematic, perspective view of a spring retainer member that forms part of the cap assembly.

FIG. 4, wherein like reference numbers refer to like components from FIGS. 1-3, schematically depicts the spring retainer member 30. Referring to FIGS. 1-4, the spring retainer member 30 in the embodiment depicted is annular. More specifically, the spring retainer member 30 has a cylindrical inner surface 42 that defines a cylindrical hole 46 that extends through the spring retainer member 30. The spring retainer member 30 also includes a plurality of spring retention portions 50 that protrude radially inward from the inner surface 42 of the spring retention member 30. Each spring retention portion 50 cooperates with the inner surface 42 to define a respective groove 54 therebetween. Each groove 54 contains a section 62 of a respective spring 58, as best seen in FIG. 1. In the embodiment depicted, there are three spring retention portions 100 evenly spaced around surface 42, defining three grooves 54, and thus three springs 58.

Figure 5:
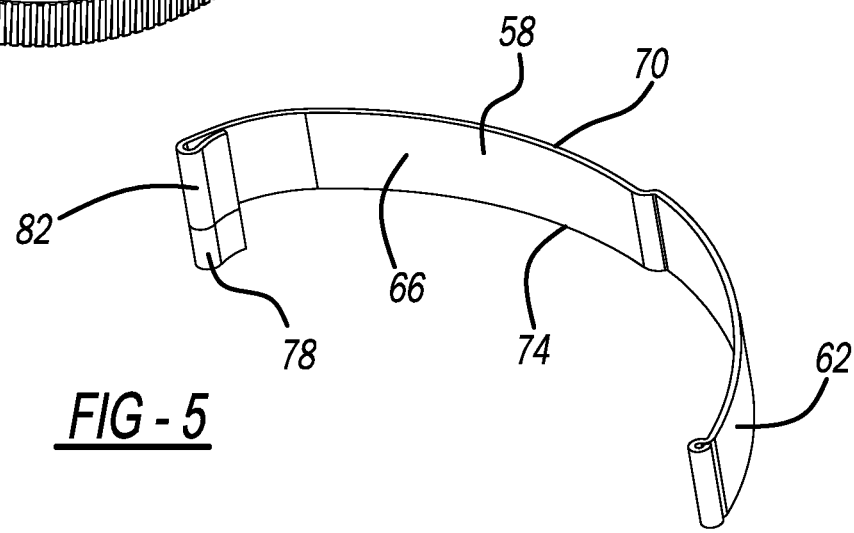
FIG. 5 is a schematic, perspective view of a spring that forms part of the cap assembly.

FIG. 5 schematically depicts one of the springs 58. Referring to FIG. 5, wherein like reference numbers refer to like components from FIG. 1-4, the spring 58 includes a first section 62 and a second section 66. Both the first section 62 and the second section 68 are arc-shaped; however, the radius of the first section 62 is substantially the same radius as the inner surface 42 of the spring retention member 30 so that the first section 62 is fittable with one of the grooves 54. The second section 66 has a radius that is larger than the radius of the first section 62. The spring 58 includes two edge surfaces 70, 74. Edge surface 70 is substantially flat, i.e., coplanar. Edge 74 is also substantially flat, i.e., coplanar, except for a protuberance 78 at one end 82 of the spring 58.

Figure 6:
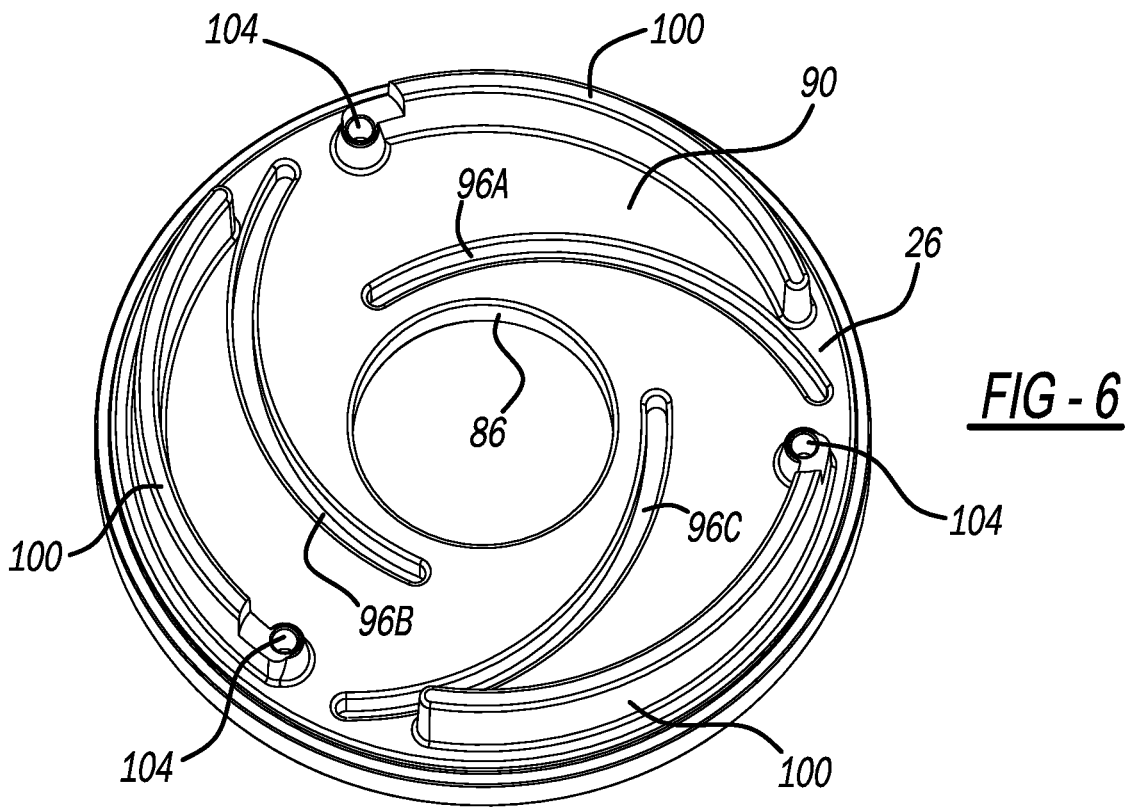
FIG. 6 is a schematic, perspective view of a spring guide that forms part of the cap assembly

FIG. 6, wherein like reference numbers refer to like components from FIGS. 1-5, schematically depicts the spring guide member 26. Referring to FIGS. 1-3 and 6, the spring guide member 26 is generally disk-shaped, with a circular aperture 86 formed therethrough. The spring guide member 26 includes a circular, generally flat surface 90. The aperture 86 is disposed in the center of the circular surface 90. The spring guide member 26 defines three grooves 96A, 96B, 96C. The grooves 96A, 96B, 96C are arcs. The spring guide member 26 also includes three arc-shaped protuberances 100 that protrude from surface 90 adjacent the circumference of the surface 90. The spring guide member 26 also defines a plurality of attachment holes 104.

The assembly 10 is configured such that the protuberances 100 extend through the cylindrical hole 46 defined by the spring retention member 26 and abut the base member 22. Each of the attachment holes 38 of the base member 22 is aligned with a respective one of the attachment holes 104. The assembly 10 also includes a plurality of threaded fasteners 108; each threaded fastener 108 extends through a respective attachment hole 38 in the base member 22 and a respective attachment hole 104 in the spring guide member 26 thereby to fasten the base member 22 and the spring guide member 26 together. The spring retention member 30 is captured between the base member 22 and the spring guide member 26. The spring retention member 30 and the protuberances 100 act as spacers maintaining distance between surface 90 and the base member 22. The base member 22, the protuberances 100, and the surface 90 cooperate to define a generally cylindrical cavity 112 having first and second openings, namely hole 36 and aperture 86. The openings 36, 86 and cavity 112 are colinear about a line 116.

Each spring 58 is positioned such that its first portion 62 is within a respective one of the grooves 54 and its second portion 66 extends between two of the protuberances 100 and into the cavity 112. Each protuberance 78 of the springs 58 extends into a respective one of the grooves 96A, 96B, 96C. Accordingly, movement of each protuberance 78, and therefore each spring end 82, is limited to an arc-shaped path defined by a respective groove 96A, 96B, 96C.

Referring to FIGS. 1-3 and 8, wherein like reference numbers refer to like components from FIGS. 1-7, the cap assembly 10 is affixed to the eyepiece 120 of an optical device 124, which, in the embodiment depicted, is a spotting scope, though the cap assembly 10 may be used with other optical devices such as binoculars, scopes, telescopes, etc., within the scope of the claims. More specifically, the eyepiece 120, which is cylindrical, is inserted into the cavity 112 through the hole 36 in the base member 22. Once inside the cavity 112, the eyepiece 122 contacts the ends 82 of the springs 58. The springs 58 are made of material that allow just enough flexibility and tension to grip the eyepiece 120 of the optic device 124. The ends 82 of the springs 58 may have a non-slip material added at point of contact with the optic device and deformed in appearance allowing for better "gripping." The ends 82 of the springs 58 thus act as contact members within the cavity 112 and are positioned and configured to contact the eyepiece 120 when the eyepiece is inserted into the cavity 112. The ends 82 are movably mounted with respect to the attachment member 18 such that the distances between the ends 82 are selectively variable to accommodate eyepieces of different sizes.

More specifically, each of the ends 82 is connected to the spring retention member 30, and thus the attachment member 18, by a respective second section 66 of the springs 58; the elasticity of the springs 58 permits movement of the ends 82. The springs 58 bias ends 82 radially inward toward line 116 and the ends of grooves 96A, 96B, 96C.

Referring specifically to FIG. 2, the plurality of contact members, i.e., ends 82, are movable between a first configuration in which the contact members are arranged in a first circle 130 having a first radius, and a second configuration in which the contact members (shown at 82A) are arranged in a second circle 134 having a second radius. The second portions 66 of the springs 58 are not shown in FIG. 2 for clarity. Circles 130, 134 may represent eyepieces of different diameters, and thus the ends 82 are adjustable to contact and thereby retain the eyepiece. It should be noted that, although in the embodiment depicted, the ends 82 of the springs 58 are the contact members, the contact members may also be separate pieces operatively connected to the springs 58 within the scope of the claimed invention.

It should also be noted that, within the scope of the claims, a portion of the spring or contact member extending into a groove 96A, 96B, 96C can include a unitary portion of the spring or contact member, such as protuberances 78, or can include a separate member that is mounted with respect to the spring or contact member. It should be further noted that an attachment member 18 may have a construction different from the assembly shown within the scope of the claims.

Referring again to FIG. 8, the camera holder 14 is rotatably mounted with respect to the attachment member 18 such that the camera holder 14 is selectively movable between a first position (shown at 14) in which the camera holder 14 is colinear with the openings and cavity about line 116, and a second position, shown in phantom at 14A in which the camera holder is not colinear with line 116. The camera holder 14 is rotatably mounted to the attachment member 18 via a hinge 138.

Figure 7:
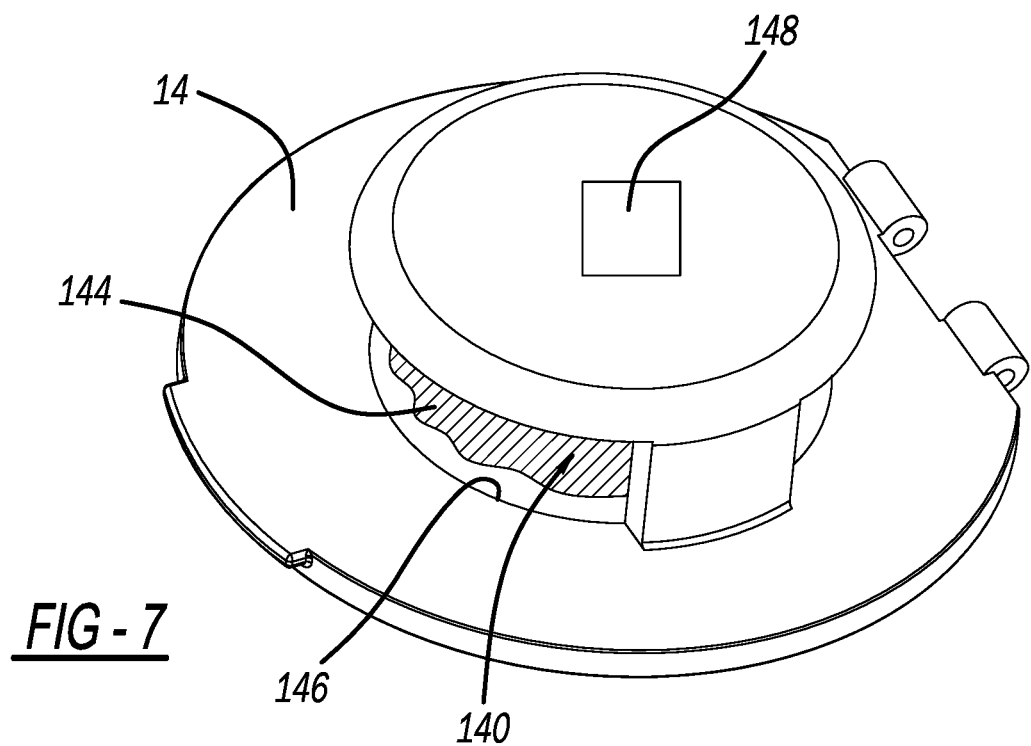
FIG. 7 is a schematic, perspective view of a camera holder that forms part of the cap assembly.
Figure 8:
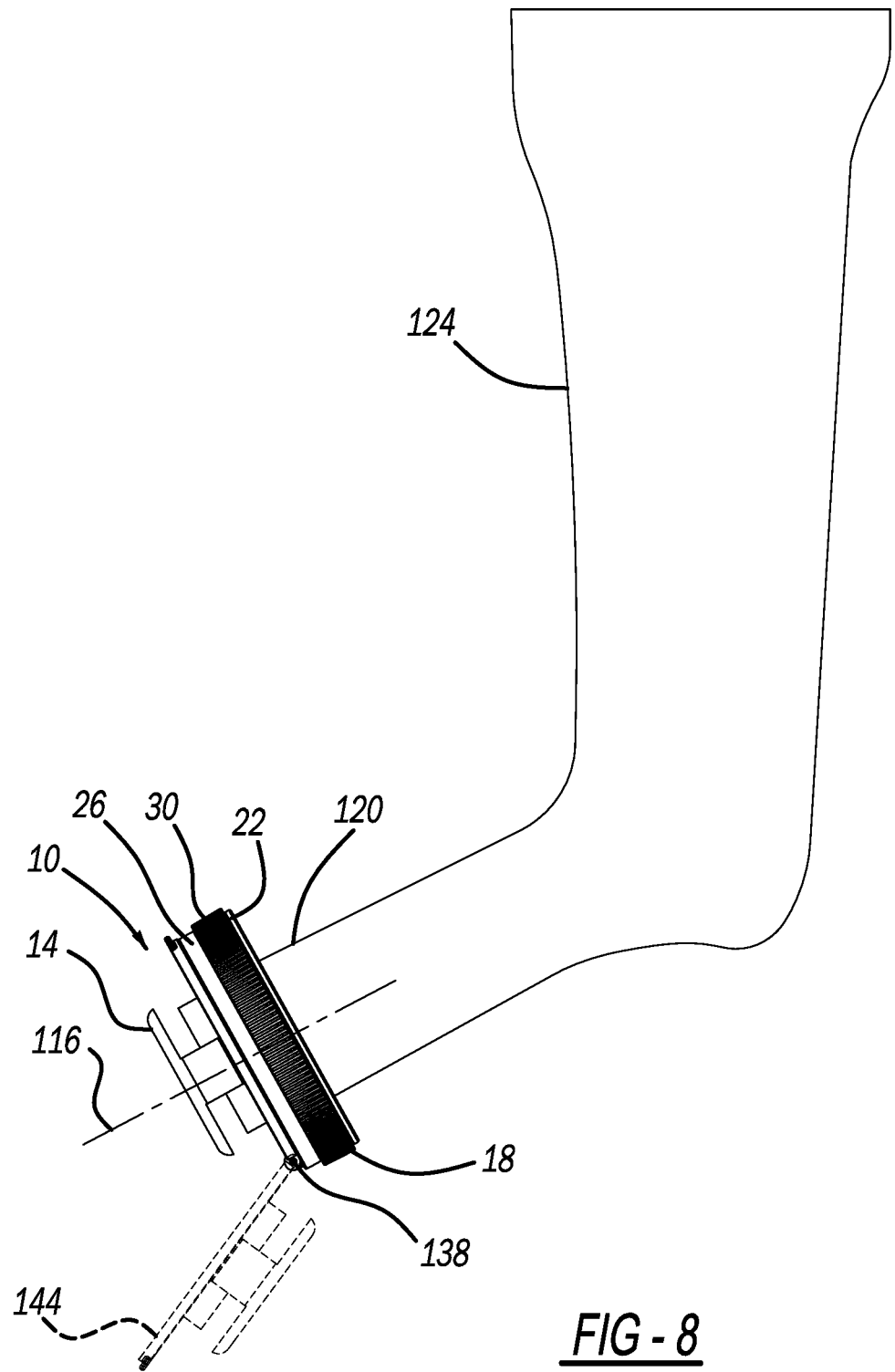
FIG. 8 is a schematic, side view of the cap assembly operatively connected to an optical device.

Referring to FIG. 7, wherein like reference numbers refer to like components from FIGS. 1-6 and 8, the camera holder 14 defines another cavity 140 in which a camera 144 is placed. A hole 146 permits the lens of the camera to be placed along line 116 to permit a line of sight to the eyepiece 120. In the embodiment depicted, the camera 144 is retained in the cavity 140 and with respect to the camera holder 14 by a magnet 148, which may be a separate piece or integrated into the camera holder 14.

While the best modes for carrying out the invention have been described in detail, those familiar with the art to which this invention relates will recognize various alternative designs and embodiments for practicing the invention within the scope of the appended claims.

The invention claimed is:

1. A cap assembly for use with an optical device having an eyepiece, the cap assembly comprising:
   an attachment member defining a first cavity having a first opening and a second opening, said first cavity, first opening, and second opening being colinear about a line, and said first opening being dimensioned such that the eyepiece is insertable into the first cavity through the first opening; and
   a camera holder rotatably mounted with respect to the attachment member such that the camera holder is selectively movable between a first position in which the camera holder is colinear with the first opening, second opening, and first cavity, and a second position in which the camera holder is not colinear with the first opening, second opening, a first cavity.

2. The cap assembly of claim 1, further comprising a plurality of contact members within the first cavity and being positioned and configured to contact the eyepiece when the eyepiece is inserted into the first cavity; wherein the contact members are movably mounted with respect to the attachment member such that the distances between the contact members is selectively variable.

3. The cap assembly of claim 2, further comprising a plurality of springs that are operatively connected to the contact members to bias the contact members toward the line.

4. The cap assembly of claim 3, wherein the plurality of contact members are movable between a first configuration in which the contact members are arranged in a first circle having a first radius, and a second configuration in which the contact members are arranged in a second circle having a second radius.

5. The cap assembly of claim 4, wherein the attachment member defines a plurality of grooves; and
   wherein a portion of each of the springs or the contact members extends into a respective groove thereby to limit movement of the contact members.

6. The cap assembly of claim 5, wherein the said grooves are arc-shaped.

7. The cap assembly of claim 1, further comprising a camera mounted with respect to the camera holder.

8. The cap assembly of claim 7, wherein the camera holder defines a second cavity; and
   wherein the camera is within the second cavity.

9. The cap assembly of claim 7, further comprising a magnet that magnetically connects the camera to the camera holder.

\* \* \* \* \*